United States Patent [19]

Jones

[11] 4,436,188

[45] Mar. 13, 1984

[54] CONTROLLED MOTION APPARATUS

[76] Inventor: Cecil R. Jones, 21127 Bank Mill Rd., Saratoga, Calif. 95070

[21] Appl. No.: 322,466

[22] Filed: Nov. 18, 1981

[51] Int. Cl.³ .............................. B06B 3/00; F16D 3/22
[52] U.S. Cl. ...................................... 188/378; 73/663; 403/57; 403/74
[58] Field of Search ........... 188/378, 379, 380, 322.19; 73/663, 665, 432 K; 248/654, 182; 403/57, 58, 74; 308/3 R, 4 R

[56] References Cited

U.S. PATENT DOCUMENTS

| | | | |
|---|---|---|---|
| 2,209,603 | 7/1940 | Johnson | 188/322 A |
| 2,781,211 | 2/1957 | Holmes | 403/57 |
| 4,011,749 | 3/1977 | Cappel | 73/665 |
| 4,171,800 | 10/1979 | Weaver | 248/182 |
| 4,186,969 | 2/1980 | Beckmann | 308/3 R |

FOREIGN PATENT DOCUMENTS 629461 9/1978 U.S.S.R. ............................. 73/663

OTHER PUBLICATIONS

"Ten Ways to . . . Prevent Piston Rod Rotation", D. Rowan, Product Engineering, Aug. 1, 1960; pp. 31-35 & 48-53.

Primary Examiner—Bruce H. Stoner, Jr.
Assistant Examiner—Robert J. Oberleitner

[57] ABSTRACT

A controlled motion apparatus capable of at least three degrees of freedom, such as apparatus for vibration testing of equipment, comprises a support suspended from a reaction mass by three anti-rotation, linear motion displacement actuator devices each extending and movable along one axis of an XYZ coordinate system. Each actuator may be independently activated to cause the support to undergo simultaneously controlled motion along the three axes.

7 Claims, 11 Drawing Figures

CONTROLLED MOTION APPARATUS

BACKGROUND OF THE INVENTION

This invention relates to novel apparatus for producing controlled motion of one mass relative to another mass.

An example of a use for such apparatus is as test apparatus to simulate the vibrations that various kinds of electrical, electronic, mechanical or hydraulic equipment may actually experience to ensure that the equipment being tested will meet its design specifications. For instance, equipment designed for use in a missile must perform its intended functions within the range of frequencies and amplitudes of motion to which the equipment is subjected during the actual missile flight. To assure operational reliability and performance of such equipment, the equipment must be tested before actual use on test apparatus capable of simulating the vibrations expected to be encountered.

Test equipment currently available generally are capable of simulating various vibrational frequencies and amplitudes with one or two degrees of freedom, i.e., along one or two axes of an XYZ coordinate system. Often, even if two axes are used, the motions are not independent. Thus testing such equipment for vibration resistance along all three axes, requires two or three separate tests with the equipment under test oriented in the two or three different directions. Aside from the additional time expended, this is clearly a compromise relative to the vibrational conditions actually experienced by the equipment, which will in actual use be simultaneously subject to vibration in all three directions.

More recent designs of test equipment provide two or three degrees of freedom. However, such designs employ multiple actuators operating in each of several of the three different directions. As a result, the equipment is expensive and cumbersome. Moreover, the multiple actuators extending in each direction must be cross-coupled or compensated to maintain dimensional stability of the equipment support. Still further the actuators used are relatively short. As a result, cross-coupling or compensation of the actuators extending in the different directions becomes necessary for the same reason. This adds to the cost and complexity of the equipment. No apparatus to the best of my knowledge is available that provides in excess of three degrees of freedom.

A principal object of the invention is simplified apparatus capable of generating controlled motion with at least three degrees of freedom.

A further object of the invention is apparatus capable of providing controlled motion with from three to six degrees of freedom.

Another object of the invention is a novel actuator for use in controlled motion apparatus.

BRIEF SUMMARY OF THE INVENTION

These and further objects of the invention are achieved, briefly speaking, by apparatus according to the invention which comprises a rigid base member commonly referred to as a reaction mass, a support, and means for mounting the support to the base member. The mounting means comprises three actuators connected between the support and base and cooperating when driven to cause the support to undergo the desired controlled motion with at least three degrees of freedom. This means that the support can be caused to vibrate with different frequencies and or amplitudes in from one to three non-parallel directions, each controlled without necessarily referencing the motion of the other one or two motions.

In a preferred embodiment, each of the actuators are constructed and mounted to cause controlled linear displacement but without rotation of the support along three orthogonal axes of an XYZ coordinate system.

In still a further preferred embodiment, means are included to provide controlled rotation of the actuators about their respective displacement axis, with the result that six degrees of freedom can be obtained.

BRIEF DESCRIPTION OF THE DRAWINGS

The invention will now be described in greater detail with reference to the accompanying drawings, wherein.

DETAILED DESCRIPTION OF PREFERRED EMBODIMENT

Figure 1:
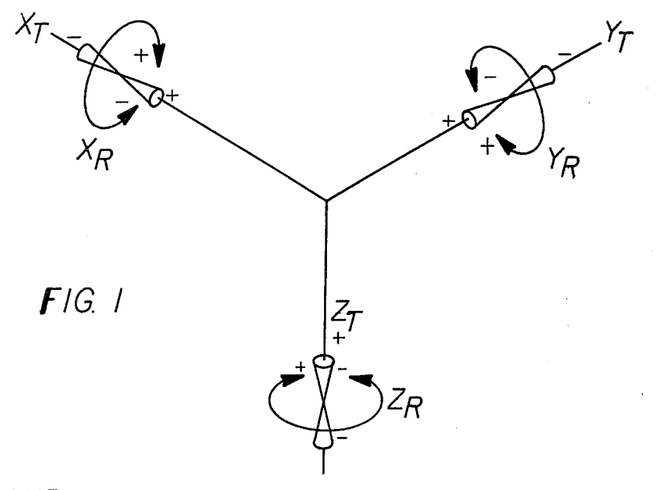
FIG. 1 shows an XYZ coordinate system for illustrative purposes.

In order to assist in understanding the underlying concepts of the invention, FIG. 1 illustrates a conventional Cartesian or XYZ coordinate system and the sign conventions to be used in the later description. The X, Y and Z axes are orthogonal from a common origin O wherein the following definitions apply:

$X_T$ = translation in the X direction;
$X_R$ = rotation about the X axis;
$Y_T$ = translation in the Y direction;
$Y_R$ = rotation about the Y axis;
$Z_T$ = translation in the Z direction;
$Z_R$ = rotation about the Z axis;
+ (Plus) = translation away from the origin or clockwise (CW) rotation viewed from the origin;
= (Minus) = translation toward the origin or counterclockwise (CCW) rotation viewed from the origin.

In this three dimensional space, there are six degrees of freedom possible, three of which are linear translation or displacement in each of the X, Y and Z directions (without regard to sign), and the remaining three are rotation about each of the three axes (also without regard to sign). In the various drawings from time to time will appear symbols from the FIG. 1 coordinate system to assist the reader in orienting the various elements constituting the invention.

Figure 2:
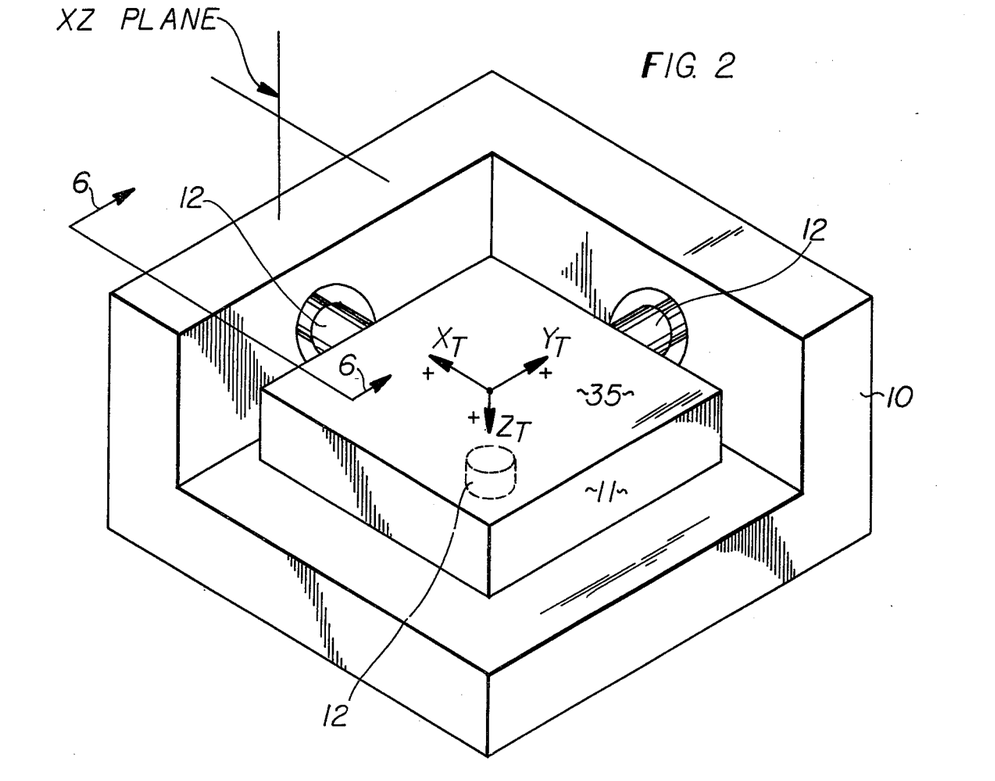
FIG. 2 is a perspective view of a preferred embodiment of the invention.

FIG. 2 schematically illustrates a vibration simulator in accordance with the invention possessing controlled independent displacement along any or all of the three orthogonal axes. The coordinate system of FIG. 1 is partly superimposed on the apparatus, which comprises a rigid base member 10 which serves as a reaction or seismic mass against the vibrations. It may, for example, be of steel reinforced concrete. A support member 11 is provided. This is conveniently made in the form of a table of light stiff construction on which the equipment to be tested will be mounted. It can be made, for example, of aluminum or magnesium of the egg-crate type. The support or table 11 is mounted to the base 10 by means of three linear motion, anti-rotation actuator devices 12. Two of the actuators 12 extending in the X and Y directions are shown in FIG. 2 in solid lines. The third, shown in dashed lines, is mounted under the table center and extends in the Z direction. The table 11 is supported on the reaction mass 10 by the three actuators 12 only.

Figure 3:
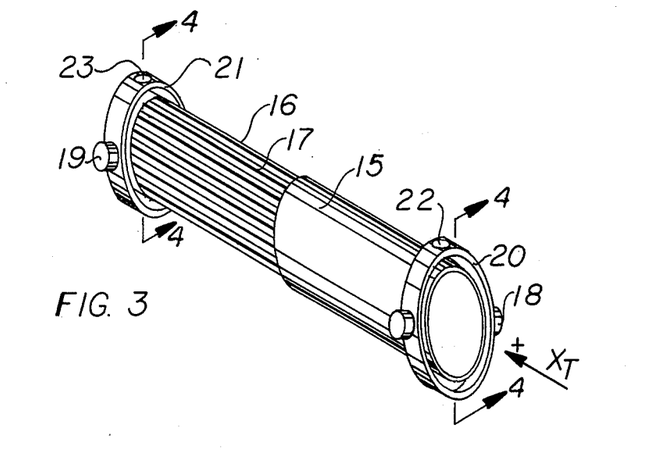
FIG. 3. is a perspective view of an anti-rotation, linear displacement actuator for use in the apparatus of FIG. 2.

The three actuators 12 are identical. A perspective view of the actuator 12 extending along the X-axis is illustrated in FIG. 3, and partly cross-sectional views along the lines 4—4 of FIG. 3 and 5—5 of FIG. 4 in FIGS. 4 and 5, respectively. The actuator 12 comprises stiff telescoping or nested splined tubes 15, 16. The splined tubes 15 and 16 allow relative axial displacement of the tubes but prevent their rotation. The splining is illustrated at 17 in FIG. 5 and extends completely around each tube. Gimbal rings 20, 21 are mounted at each end of the nested tubes 15, 16. The gimbal ring 20 mounted on the end of outer tube 15 comprises a first gimbal pin 22 (shown vertical in the drawings) which is journalled through the center of the end of the outer tube 15 and allows the actuator to pivot about the pin axis (Y-axis). The gimbal ring 21 secured to the inner tube 16 end comprises a similarly oriented first gimbal pin 23 in a similar mounting configuration.

Figure 4:
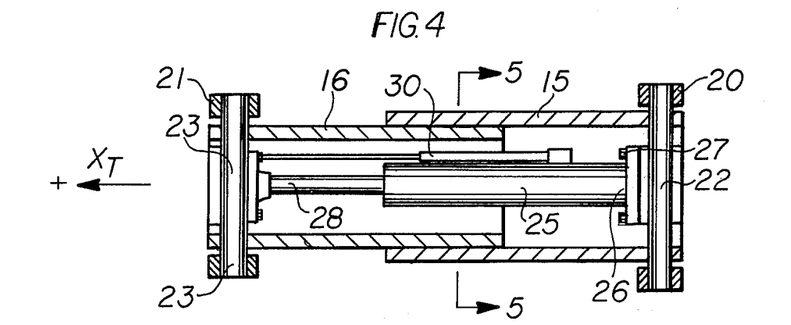
FIG. 4 is a partly cross-sectional view along the line 4—4 of FIG. 3.
Figure 5:
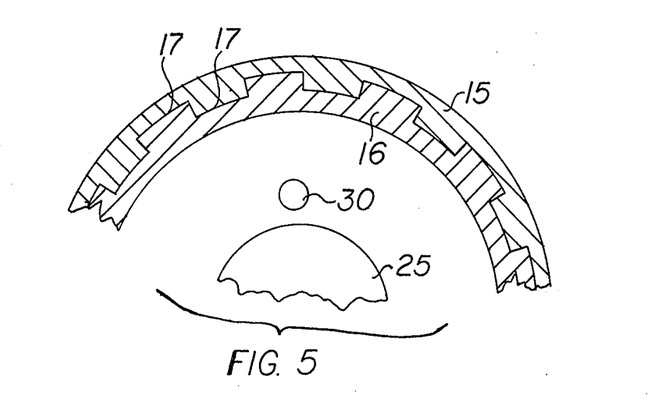
FIG. 5 is a partly cross-sectional view along the line 5—5 of FIG. 4.

Within the nested tubes 15, 16 is mounted an hydraulic cylinder 25. The large cylinder end 26 at the right of FIG. 4 is secured as by a bracket and bolts 27 to the first gimbal pin 22 of the ring 20. The smaller cylinder end or piston rod 28 is similarly fastened to the first gimbal pin 23 of the left gimbal ring 21. The usual conduits or tubes for supplying hydraulic fluid to the cylinder 25, which are conventional, have been omitted for clarity.

Mounted next to the actuator cylinder 25 is a position transducer or indicator 30. One end of the position indicator 30 is fixed to the cylinder housing 25, and the opposite movable part of the position indicator 30 is fixed to the rod end 28. Thus, displacement of the nested tubes 15, 16 can be detected by the position indicator 30. The hydraulic cylinder 25 is a conventional positionable linear driving device, and the position indicator 30 is similarly conventional. It can be one of a number of commonly available linear position indicating devices, such as a linear variable differential transformer, which generates an electrical signal whenever displacement occurs from an initial set position.

Figure 6:
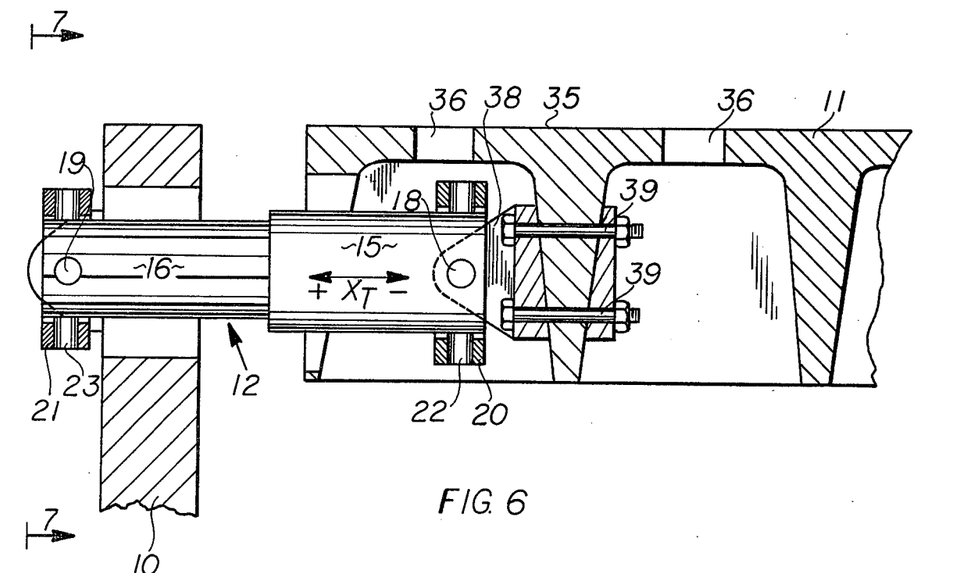
FIG. 6 is a partly cross-sectional view along the line 6—6 of FIG. 2 showing mounting of the actuator of FIG. 3.
Figure 7:
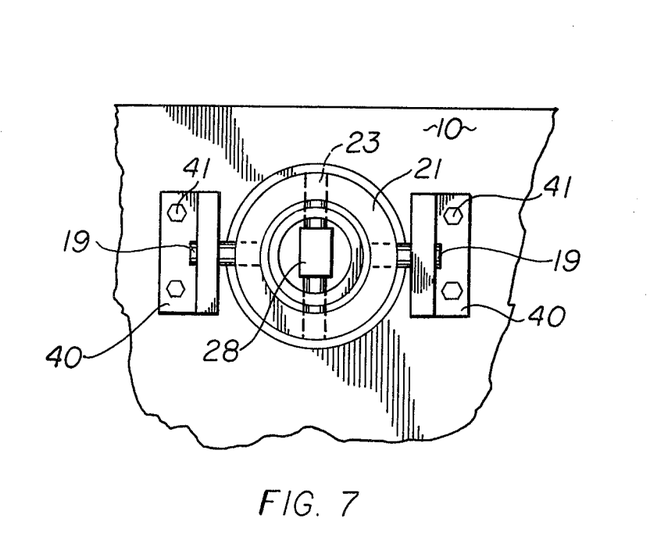
FIG. 7 is an end view of FIG. 6 along the line 7—7.

The mounting of each linear actuator to the table 11 and reaction mass 10 is illustrated in FIGS. 6 and 7. FIG. 6 is a partial sectional view along the line 6—6 of FIG. 2, and FIG. 7 is a partial end view along the line 7—7 of FIG. 6. Firstly, it will be observed that the table 11 is a configured as an egg-crate, with a table top designated 35 and provided with suitably located holes 36 for mounting the equipment to be tested. As will be observed in FIG. 6, a bracket 38 securely fastens the laterally-oriented or second gimbal pin 18 of the ring 20 to a section of the table as by bolts 39. The opposite end of the actuator 12 is similarly securely fastened by a pair of brackets 40, bolted 41 to the reaction mass 10, to the laterally-oriented second gimbal pin 19 of the left gimbal ring 21. The gimbal pins at each end are located so that their center lines intersect, as shown, at the central axis of the nested tubes 15, 16. In FIG. 6, the transducer 30 has been omitted for clarity. The remaining two actuators 12 extending in the Y and Z directions are similarly mounted, so that the table 11 is suspended on the reaction mass 10 only by the three orthogonally directed actuators 12.

In operation, a suitable closed loop control system (not shown) similar to that employed in known vibration simulators providing one to three degrees of freedom, supplies hydraulic fluid to each of the actuators 12 to cause each of the actuators to undergo a vibrational displacement along its respective X, Y or Z axis with a frequency and amplitude simulating the conditions the equipment will be subjected to in actual field use. Each of the actuators 12 can thus be caused to displace the table along its displacement axis with the required controlled motion. Since the three actuators 12 allow independent controlled displacement along each of the orthogonal X, Y and Z axes, the table will be simultaneously vibrated in all three directions and thus with three degrees of freedom. The gimbal mountings at each end of each actuator allows the actuator to pivot off of its displacement axis to accomodate a displacement by another actuator along the latter's displacement axis, while resisting torsional forces. This is schematically illustrated in FIG. 8 for the X-axis actuator 12 and Z-axis actuator 12 upon displacement of the X-axis actuator.

Figure 8:
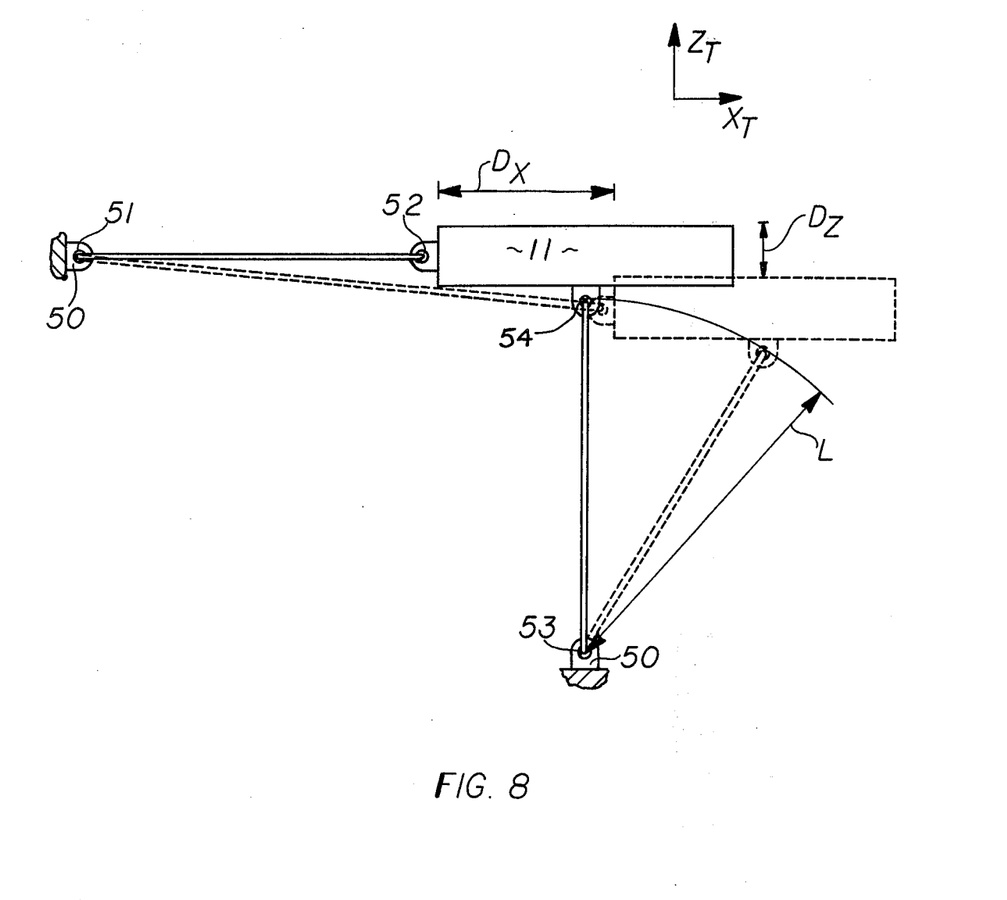
FIG. 8 is a schematic view illustrating operation of the apparatus of FIG. 2.

In FIG. 8, reference numeral 50 represents the fixed reaction mass, reference numeral 51 the gimbal mounting at the reaction mass, and reference numeral 52 the gimbal mounting at the table 11. The X-axis actuator, which is not shown, would be connected between the two gimbal rings 51 and 52.

Similarly, reference numeral 50 at the bottom is the reaction mass part underneath the table 11, and the corresponding gimbal mountings for the Z-axis actuator is shown at 53 at the reaction mass and at 54 at the table bottom. The Z-axis actuator, not shown, would be connected between its two gimbal rings 53 and 54. The solid lines in the figure show a first position of the table 11. Assume now that the X-axis actuator is displaced toward the right in FIG. 8 by an amount Dx, while the Y-axis and Z-axis actuators remain inactive. Due to the anti-rotation construction of the actuators (the splined nested tubes), the Y-axis actuator prevents rotation of the table 11 around the Y-axis ($Y_R$ in FIG. 1). As a result, the three actuators will tilt to accomodate the displacement $D_X$. The new or second position taken up by the table 11 is illustrated in dashed lines in FIG. 8. The X-axis actuator as shown will be tilted downward. The Y-axis actuator not shown will undergo a similar downward tilting as well as a tilting toward the right of FIG. 8. The Z-axis actuator will pivot along an arc to the right as illustrated. The result is that the table 10 in addition to undergoing the displacement $D_X$ to the right, will also undergo a downward displacement $D_Z$. (For completeness sake, the displacements have been exaggerated to simplify the illustration). The displacement $D_Z$ represents an undesired deviation from pure translation in the X-Y plane. This deviation may be reduced to the desired level by appropriate selection of the dimensions $D_X$ and L, and the spacing between the end gimbal ring mounts.

For example, assume the desired maximum deviation or error is 4% of the total displacement, and the desired maximum half displacement (dimension $D_X$) is 15 cm, providing a total displacement of 30 cm. Then dimension L is chosen to be 100 cm. These values are typical of desired simulation. Some current designs which attempt similar solutions employ four Z-axis actuators, two X-axis actuators, and one Y-axis actuator (but without the anti-rotation feature), and attempt to compensate for any undesired error by electro-hydraulic cross control. That is, actuation in one direction, say the X-direction, automatically results in being applied to the Z-axis actuators a matching signal that is proportional to the magnitude of the X-displacement. However, such known designs have not performed as desired, because there is an inherent error in the signal processing of the order of 10% of the displacement. In addition, due to the use of multiple actuators in both the Z and X axes, compensation cross-control is needed among the actuators extending in the same direction to maintain the table torsionally stable.

In contrast, in the apparatus according to the invention, only three actuators are needed, one only extending in each of the three orthogonal directions, and there exists no need for such cross-controlling or compensation circuitry. Thus, the equipment is much less complex, and the required control system is greatly simplified, because each channel of controlled feedback can be treated as a simple linear actuator. Further, one to six degrees of freedom may be obtained as may be desired. It should also be noted that in the example given, the error was calculated for maximum displacement, which for seismic simulation occurs only at low frequencies of about 1 $H_z$. At frequencies of about 10 $H_z$, the error is reduced to about $\frac{1}{3}$%, which is fully acceptable. In the example given, the table can have dimensions of one meter by one meter, and should be able to support loads up to about 500 kilograms.

To summarize, in the operation of the apparatus according to the invention, a conventional electro-hydraulic closed loop control system or electrical feedback system positions independently each linear motion, anti-rotation actuator device 12. Since one end is attached to the fixed reaction mass and the other end to the test table, the test table assumes the desired driven position. The splined construction prevents rotation $X_R$ in the $Y_T Z_T$ plane by providing a load path from the table brackets through the spline to the reaction mass. The splined construction of the other actuators 12 prevent the corresponding rotations $Y_R$ and $Z_R$. However, the gimbal mountings at each end of the linear motion, anti-rotation actuators does not restrict linear motion in the $X_T$, $Y_T$ or $Z_T$ directions. Thus the table 11 is maintained torionally stable, that is, substantially in the X-Y plane or parallel thereto upon actuation of the X-axis, Y-axis, or Z-axis actuator 12. By combining the three actuators operable in the three orthogonal X, Y and Z axes, three controllable independent linear degrees of freedom are achieved, and the test table is maintained dynamically stable by providing load paths via the splined construction and gimbal mountings for the three torsional components of motion $X_R$, $Y_R$ and $Z_R$.

DESCRIPTION OF SECOND EMBODIMENT

Figure 9:
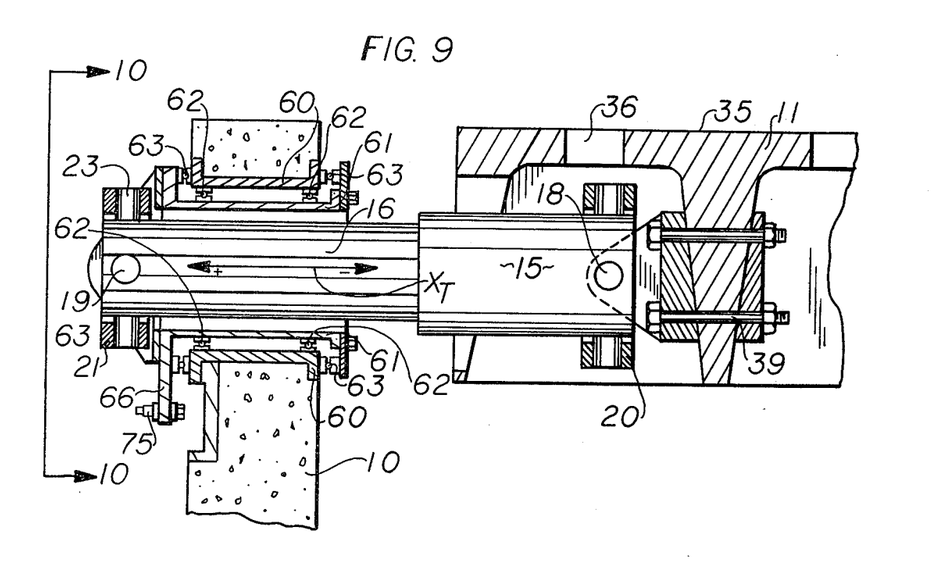
FIG. 9 is a view similar to FIG. 6 of a modification.
Figure 10:
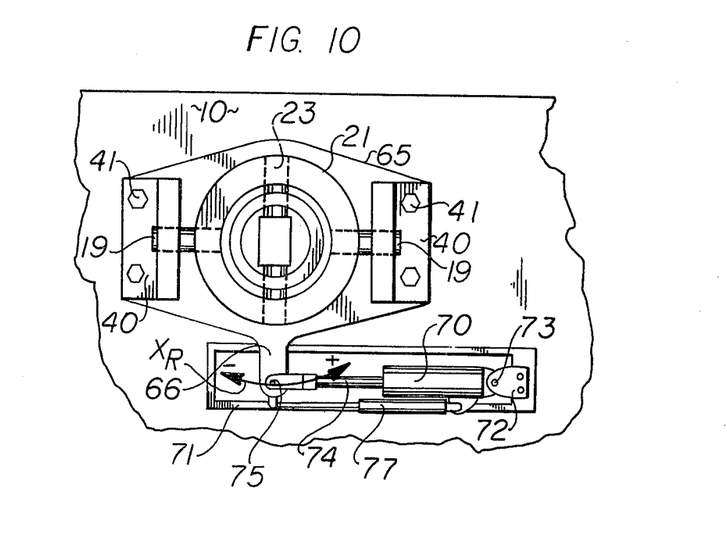
FIG. 10 is a view similar to FIG. 7 along the line 10—10 of FIG. 9.

The above concept can be extended to apparatus to provide six degrees of freedom by mounting the gimbal ring for rotation within a sleeve in the reaction mass. This is illustrated in FIGS. 9 and 10 for the X-axis actuator 12. Similar constructions would be provided for the Y-axis and Z-axis actuators. Similar references numerals are employed for corresponding parts of the embodiment illustrated in FIGS. 6 and 7.

In FIGS. 9 and 10, an insert 60 is secured to the reaction mass 10. A rotation sleeve 61 is journalled within the insert 60 by way of two rotation bearings 62 and two thrust bearings 63. The left side of sleeve 61 is extended to form a bracket 65 which is fastened to the brackets 40 which in turn are secured to the second gimbal pin 19 at the left side of FIG. 9. The bracket 65 of the sleeve 61 has an extension arm 66. An additional hydraulic cylinder 70 is provided which is mounted on the reaction mass 10 by way of an insert 71 embedded therein. The cylinder 70 end is pivotably mounted to the reaction mass by a bracket 72 and pin 73. The rod end 74 is secured by a pivotable pin 75 to the extension arm 66. A conventional position transducer 77 is mounted between the cylinder 70 and rod 74 ends. As before, the conventional fluid couplings are not shown for clarity. When the rotation cylinder 70 is actuated, the splined linear motion actuator 12 is rotated ($X_R$) about the X-axis, and the amount of rotation is sensed by the rotation position transducer 77. This construction can be employed to rotate or rock the table 11 about the X-axis in a controlled manner. The similar constructions at the Y-axis linear actuator and the Z-axis linear actuator will similarly allow controlled rotation or rocking of the table about their respective axes, to produce as desired $Y_R$ and $Z_R$. Thus, the test table will possess six independently controllable degrees of freedom.

If the rotation of one actuator is significant, it may be necessary to rotate the other two actuators an appropriate amount to accommodate the rotational motion of the one actuator. This is easily achieved by a conventional electronic system which receives the signals from the rotation position indicators and supplies the necessary fluid to the various actuators to maintain stability. Such systems are well known in the art as closed loop control systems and can be readily applied by the skilled artisan to the apparatus of the invention. Thus, the apparatus with the rotational feature above described with reference to FIGS. 9 and 10 provides six degrees of freedom under user control and any predetermined motion set. Moreover, any single degree of freedom or any multiple of the six degrees of freedom are also obtainable as will be readily apparent to those skilled in the art.

It will be understood that where reference in this description is made to hydraulic position or feedback position control, this can also be achieved by equivalent means such as digital electro-mechanical position control. The former employs well known analog closed loop control principles. The latter is also commercially available in digital form from minicomputer suppliers. For instance, Hewlett-Packard has available an HP 2100 MX minicomputer, and supplies software which will provide electrical signals, which will cause fluid to be supplied independently to any actuator 12 to cause it to undergo a desired frequency and amplitude of linear displacement, and uses the signal derived from the associated position indicator in a feedback mode to ensure that the cylinder is maintaining the desired vibration. Similar means can be employed to drive each of the actuators 12 in their linear displacement, and can also be used to actuate independently the rotational cylinders to obtain the additional three degrees of freedom as mentioned, though, in the latter case, some cross-control of the three rotational cylinders may be needed for compensation. For those who wish more details on digital-control techniques to perform closed loop position control with mono-axis or cross-axis compensation for use with a vibration test system, reference is made to a paper presented by Smith et al at the 1980 SAE Aerospace Congress held at Los Angeles on 13 Oct. 1980 (paper No. 801233) entitled "Digital Control Techniques For A Three Axis Vibration Test System", and a recent article on LVDT industrial control circuitry and systems, Electronic Design, Sept. 17, 1981, pps. 151–156, both of whose contents are herein incorporated by reference.

Figure 11:
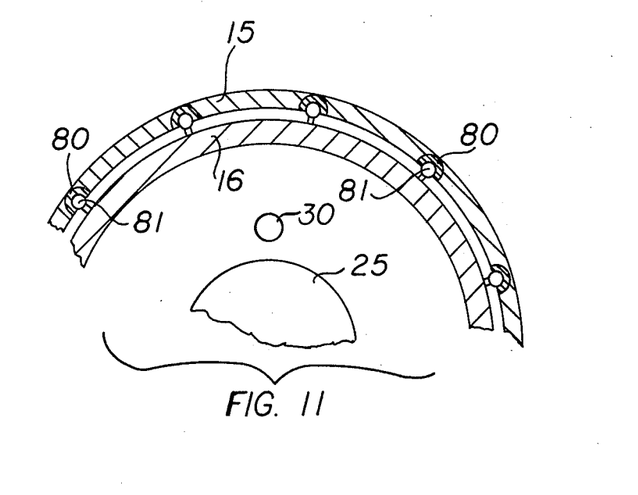
FIG. 11 is a view similar to FIG. 5 of a modification.

As will be clear from the foregoing, one of the key features of the invention is the anti-rotational construction of the linear displacement actuators to provide torsional stability of the table. This is achieved by the preferred splined tube construction described in connection with FIGS. 3–5. The invention is not limited to the latter, and other constructions capable of providing anti-rotation linear displacement can be substituted. FIG. 11 shows one such alternative construction, in a view similar to FIG. 5. In this embodiment, linear bearings are employed between the nested tubes 15 and 16. Elongated arcuate raceways 80 are provided in spaced relation around the inside of outer tube 15, and cooperating bearing elements 81 are mounted on the outer surface of inner tube 16. These linear bearings 80, 81 allow linear displacement but without permitting rotation of the nested tubes 15 and 16.

While the principles of the invention have been described in connection with apparatus for vibration testing of equipment, it will be understood that the same concepts are applicable to other types of equipment. An example of another type is a machine tool having a cutter, wherein the cutter is held in a fixed position and the workpiece is mounted on a table movable along three independent axes, for profile shaping or cutting of the workpiece by the cutter. In this case, the control system would be programmed to cause the actuators to displace the table carrying the workpiece in the desired X, Y and Z directions so that the cutter could carry out the desired milling of the workpiece. The same benefits would be achieved in this application of the invention as are obtained with the vibration simulator. Other uses of the inventive principles herein described will be apparent to those skilled in the art.

While the use of the gimbal mountings at opposite ends of the actuators are preferred, it will be understood that other mechanisms performing similar functions can be substituted. For example, as will be evident from the text "Mechanisms and Dynamics of Machinery" by Mabie and Ocoirk (2nd Ed., 1963, Wiley), pps. 26–32, a bimbal is a modification of a Hook-type universal joint, and the Bendix-Weist Joint illustrated in FIG. 2.23 on p. 29, as an example, may be adapted to perform the gimbal function described. This is accomplished by providing a direct mounting for the table 11 in place of shaft B shown in FIG. 2.23, and the tube 15 with actuator 25 and position indicator 30 within, in place of shaft A as shown in Fig. 2.23 of the reference above.

While my invention has been described in connection with specific embodiments thereof, those skilled in the art will recognize that various modifications are possible within the principles enunciated herein and thus the present invention is not to be limited to the specific embodiments disclosed.

What is claimed is:

1. Controlled motion apparatus comprising a rigid base member, a support member, and means for mounting the support member to the rigid base for controlled motion relative to the base, said support member mounting means comprising three independently-driven displacement actuators each having a fixed part and a linearly movable part and having one of said parts connected by means of a first non-rotatable universal joint to a region of said support member and having the other of said parts connected by means of a second non-rotatable universal joint to a region of said rigid base, each of said actuators being capable upon actuation of causing a linear motion displacement of said support member along one of three orthogonal axes of an XYZ coordinate system but without permitting rotation about its respective displacement axis of the actuator movable part with respect to its fixed part or of the actuator fixed part in response to a linear displacement of the support along any of the three orthogonal axes, said non-rotating actuators by means of the first and second non-rotatable universal joint connections cooperating, during driving of the actuators to cause the said support member to undergo a controlled motion relative to the rigid base member, to maintain the support member substantially parallel to a desired plane formed by two axes of the coordinate system and to constrain the motion of said support member substantially parallel to said desired plane, and means connected to the apparatus for sensing the amount of support member displacement in its three displacement axes and generating signals representative of said displacement.

2. Controlled motion apparatus as claimed in claim 1, wherein the universal joints connected to each actuator comprises gimbal rings mounted at each actuator end with said gimbal rings each including first and second transversely-oriented gimbal pins, and means for securing the first gimbal pins of the gimbal rings at opposite ends of each actuator and means for securing the second gimbal pins of the gimbal rings to the support and base members, respectively.

3. Controlled motion apparatus as claimed in claim 1, wherein each of the actuators comprise nested tubes constituting the fixed and movable parts and having anti-rotation means, and means within the nested tubes for displacing them relative to one another, the sensing means sensing the displacement being connected to the nested tubes.

4. Controlled motion apparatus as claimed in claim 1, and further comprising means for rotating as a whole each actuator including both the fixed and movable parts and including the non-rotatable first and second universal joints about its displacement axis, said rotating means being separate from the actuator's linear displacement.

5. Controlled motion apparatus as claimed in claim 3, wherein the anti-rotation means comprise a splining structure coupling together the nested tubes.

6. Controlled motion apparatus as claimed in claim 3, wherein the anti-rotation means comprise linear bearings coupling together the nested tubes.

7. Controlled motion apparatus as claimed in claim 4, wherein the actuator-rotating means comprise means for journalling each actuator within the rigid base member, and means coupled between the actuator and the rigid base for controllably rotating each actuator independently of the other actuators.

* * * * *